US006696131B1

United States Patent
Nishimura et al.

(10) Patent No.: US 6,696,131 B1
(45) Date of Patent: Feb. 24, 2004

(54) CERAMIC HONEYCOMB STRUCTURE

(75) Inventors: Mamoru Nishimura, Nagoya (JP); Takeshi Ueda, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 108 days.

(21) Appl. No.: 09/612,278

(22) Filed: Jul. 7, 2000

(30) Foreign Application Priority Data

Aug. 11, 1999 (JP) .............................. 11-227174

(51) Int. Cl.⁷ ................................... B32B 3/12
(52) U.S. Cl. .................... 428/116; 55/523; 422/180; 422/222
(58) Field of Search ................ 428/116, 118; 55/523; 422/168, 177, 180, 211, 222

(56) References Cited

U.S. PATENT DOCUMENTS 4,953,627 A  * 9/1990 Ito et al.
5,063,029 A    11/1991 Mizuno et al.
5,286,460 A  * 2/1994 Abe et al.
5,651,088 A    7/1997 Abe et al.
5,664,049 A  * 9/1997 Kondo et al.

FOREIGN PATENT DOCUMENTS

JP      3-295184    12/1991
JP      7-163888     6/1995

* cited by examiner

Primary Examiner—Deborah Jones
Assistant Examiner—Wendy Boss
(74) Attorney, Agent, or Firm—Nixon & Vanderhye PC

(57) ABSTRACT

There is provided a ceramic honeycomb structure with excellent thermal shock resistance. The ceramic honeycomb structure (1) comprises partitions (10) arranged in a lattice forming a plurality of cells (19) and an outer shell (15) surrounding the perimeter of the partitions (10), and the outer shell (15) is provided with slits (2) formed by cutting the outer shell (15) in the lengthwise direction along its entire length.

12 Claims, 4 Drawing Sheets

CERAMIC HONEYCOMB STRUCTURE

BACKGROUND OF THE INVENTION

1. Field of the Invention

The present invention relates to a ceramic honeycomb structure used as a catalyst carrier for automobile exhaust gas purifiers and the like, and more particularly it relates to a ceramic honeycomb structure with excellent thermal shock resistance.

2. Description of the Related Art

As shown in FIGS. 6A and 6B, conventional catalyst carriers for exhaust gas purifiers have a ceramic honeycomb structure 9 wherein a plurality of cells 99 are formed by partitions 90, made of a ceramic such as cordierite, which are arranged in a lattice, and surrounded at the perimeter by an outer shell 95 made of the same material as the partitions 90. The exhaust gas purification catalyst is held on the surface of the partitions 90 of the ceramic honeycomb structure 9 whereby the exhaust gas purifying function is exhibited.

When this type of ceramic honeycomb structure 9 is used as a catalyst carrier in an exhaust gas purifier, it is directly exposed to high-temperature exhaust gas and is subjected to repeated thermal shocks. Such thermal shocks often lead to cracking in the outer shell or other parts of the ceramic honeycomb structure. The ceramic honeycomb structure must therefore exhibit high thermal shock resistance so that the thermal shocks received during use do not cause cracking.

Also, with the recent demand for high performance from exhaust gas purifiers, modifications are being made to allow a more rapid temperature increase than in conventional catalyst carriers, so that the catalytic function can be exhibited earlier. For example, the partitions may be made thinner in order to lower the heat capacity of the partitions. When the partitions are made thinner, the outer shell is thickened in order to provide the required strength for the entire ceramic honeycomb structure. Such thinning of the partitions and thickening of the outer shell results in greater stress on the outer shell upon thermal shock, thus rendering it more susceptible to cracking.

For this reason it has been desired to further improve the thermal shock resistance of ceramic honeycomb structures.

It is an object of the present invention, which has been accomplished in light of these problems of the prior art, to provide a ceramic honeycomb structure with excellent thermal shock resistance.

SUMMARY OF THE INVENTION

The present invention provides a ceramic honeycomb structure comprising partitions arranged in a lattice forming a plurality of cells and an outer shell connected with the partitions and surrounding the perimeter of the partitions,
the ceramic honeycomb structure being characterized in that the outer shell is provided with slits formed by cutting the outer shell in the lengthwise direction along its entire length.

The most notable feature of the invention is the formation of slits in the outer shell along its entire length.

The slits are formed by cutting from the outer shell. The presence of gaps between both edges of the cut slits is optional. That is, the slits may be formed in such a manner that the outer shell portions bordering both sides of each slit are separated and the outer shell portions on both sides may thus be separated by a gap preventing their contact, or they maybe in contact without a gap.

The method of forming the slits is preferably a method in which they are formed simultaneously with extrusion molding of the ceramic honeycomb structure. This allows the slits to be formed without requiring any special steps, and also allows satisfactory finishing of the slit width, shape, etc.

The partitions and outer shell are constructed of a ceramic such as, for example, cordierite. Cordierite has the general chemical composition of $SiO_2$: 45–55 wt %, $Al_2O_3$: 33–42 wt %, MgO: 12–18 wt %.

As mentioned above, the ceramic honeycomb structure of the invention has slits in the outer shell. The ceramic honeycomb structure therefore has thermal shock resistance which is vastly superior to that of a structure in which no slits are provided.

When the ceramic honeycomb structure is suddenly heated by exhaust gas, for example, it undergoes a sudden thermal expansion. The thermal expansion is usually greatest in the partition sections through which most of the exhaust gas passes, and the thermal expansion is different from that of the outer Shell. A large tensile stress is applied to the outer shell as a result. Consequently, cracks have often occurred in conventional outer shells that cannot withstand such tensile stress.

According to the invention, the aforementioned slits are provided in the outer shell, thus dividing the outer shell. As a result, when tensile stress is applied to the outer shell, the widths of the slits become larger so that the tensile stress is adequately released. Moreover, since the slits are provided along the entire length of the outer shell, it is also possible to avoid a concentration of stress. A ceramic honeycomb structure of the invention with such slits therefore exhibits vastly improved thermal shock resistance over the prior art.

Thus, according to the invention, it is possible to provide a ceramic honeycomb structure with excellent thermal shock resistance.

The cut cross-sections in the outer shell formed by the slits are preferably in contact with each other. That is, the slit width is preferably zero. This eliminates any gaps in the slit sections, thus preventing outer shell chipping and the like.

A plurality of the slits are preferably formed. This will allow thermal shock stress release at a plurality of locations, and thereby improve the thermal shock resistance.

The slits are preferably formed with roughly equivalent spacing between them. This will allow balanced stress release upon subjection to thermal shock, thus improving the thermal shock resistance.

The spacings between the slits are preferably provided such that at least two partitions are connected to the outer shell between adjacent slits. If the spacing between the slits is provided such that less than two partitions are connected to the outer shell between adjacent slits, it may not be possible to achieve an effect of reinforcement of the honeycomb structure with the outer shell.

The outer shell preferably has a cylindrical shape with an outer diameter of 50–150 mm and a length of 50–200 mm, the thickness of the partitions is preferably 0.04–0.3 mm, and the cells are preferably square or hexagonal with a length on one side of 0.5–1.5 mm. A ceramic honeycomb structure of such dimensions exerts stress on the outer shell particularly upon thermal shock, but the slits can reliably provide stress release and thus realize excellent thermal shock resistance.

BRIEF DESCRIPTION OF THE DRAWINGS

FIG. 1A is a perspective view of the structure, FIG. 1B is a front view of the structure, and FIG. 1C is a magnified front view of a slit section of the structure.

FIG. 4A is a perspective view of the structure, and FIG. 4B is a front view of the structure.

DESCRIPTION OF THE PREFERRED EMBODIMENTS

Ceramic honeycomb structures according to embodiments of the invention will now be explained with reference to FIGS. 1 to 5.

For these embodiments, there were prepared 4 types of ceramic honeycomb structures to be used as catalyst carriers for an automobile exhaust gas purifier, i.e. Examples E1–E3 as invention products and Comparative Example C1 as a prior art product, and their performance was evaluated.

EXAMPLE E1

Figure 1A:
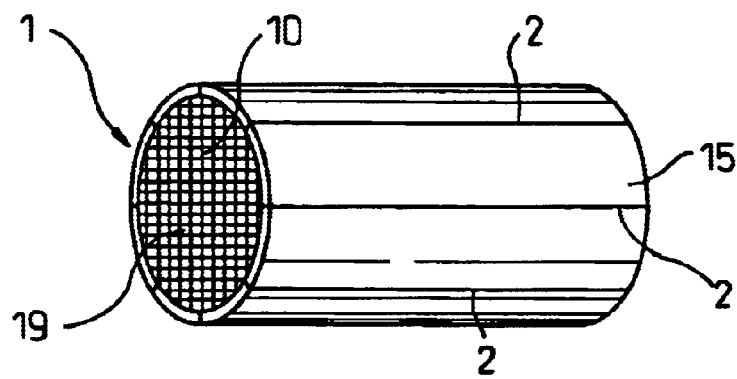
FIGS. 1A to 1C are illustrations of the ceramic honeycomb structure of Example E1.
Figure 1B:
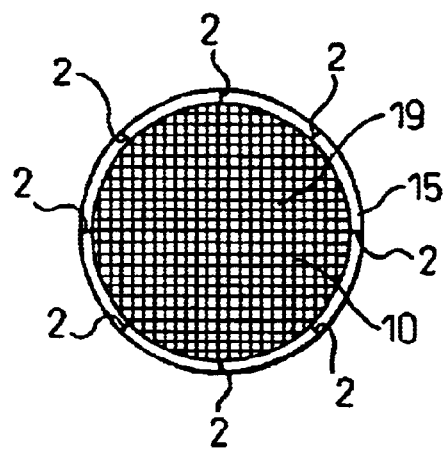
Figure 1C:
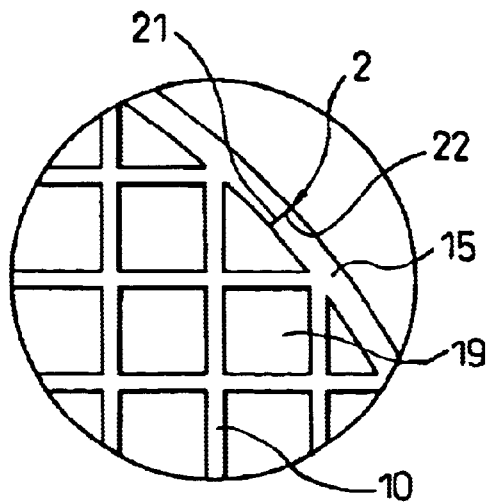

As shown in FIGS. 1A to 1C, the ceramic honeycomb structure 1 of Example E1 comprises partitions 10 arranged in a lattice to form a plurality of cells 19, and an outer shell 15 surrounding the perimeter of the partitions 10. The outer shell 15 is provided with slits 2 formed by cutting the outer shell 15 in the lengthwise direction along its entire length.

The ceramic honeycomb structure 1 of this example is provided with a plurality of square cells 19 formed by the partitions 10 inside the cylindrical outer shell 15. For the size of each section, the outer diameter of the outer shell 15 was 100 mm, the length thereof was 120 mm, the thickness of the outer shell was 0.3 mm, the thickness of the partitions 10 was 0.1 mm and the side length of the square cells 19 was 1.27 mm.

The ceramic honeycomb structure 1 was manufactured by extrusion molding a ceramic material composed mainly of cordierite, and firing it after drying.

The slits 2 were formed simultaneously during the extrusion molding.

The slits 2 of this example were eight slits formed at a spacing dividing the cylindrical outer shell 15 into eight equal parts in its circumferential direction. The slits 2 were formed parallel to the direction in which the partitions 10 were arranged, i.e., in the lengthwise direction of the ceramic honeycomb structure 1 along its entire length. As shown in FIG. 1C, the slits were formed with a width of zero. Thus, the edges 21, 22 on both sides forming each slit 2 are in contact with each other.

EXAMPLE E2

Figure 2:
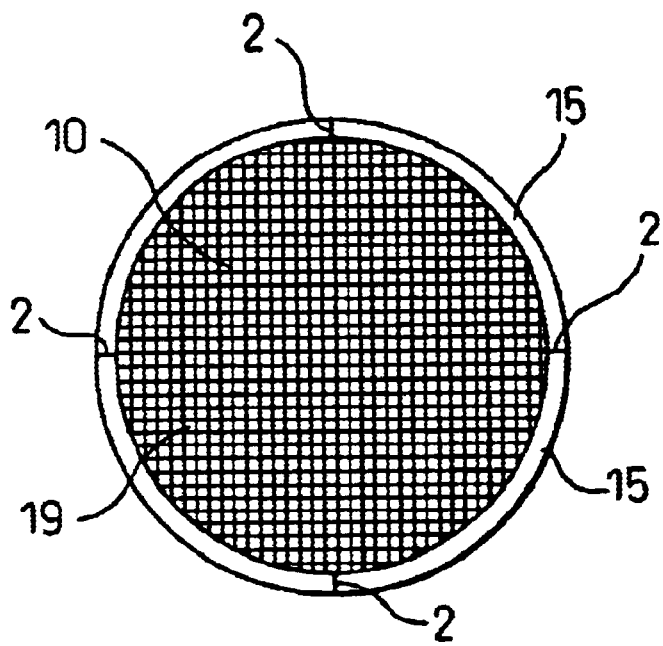
FIG. 2 is a front view of the ceramic honeycomb structure of Example E2.

As shown in FIG. 2, the ceramic honeycomb structure of Example E2 is an example in which the number of slits 2 of Example E1 was reduced to four and the slits were formed at locations dividing the circumference of the outer shell 15 into 4 equal parts. The rest of the structure is the same as Example E1.

EXAMPLE E3

Figure 3:
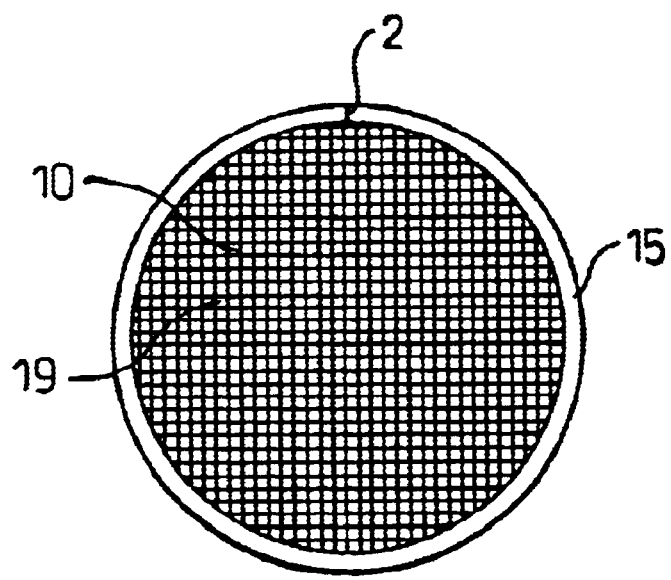
FIG. 3 is a front view of the ceramic honeycomb structure of Example E3.

As shown in FIG. 3, the ceramic honeycomb structure of Example E3 is an example in which the number of slits 2 of Example E1 was reduced to only one. The rest of the structure is the same as Example E1.

COMPARATIVE EXAMPLE C1

Figure 4A:
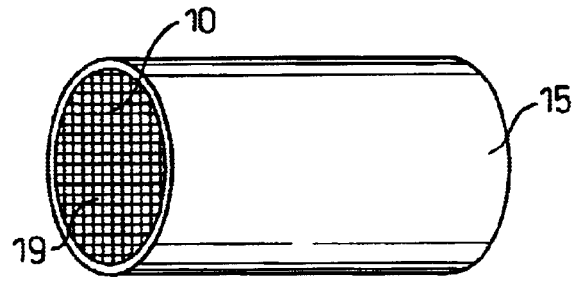
FIGS. 4A and 4B are illustrations of the ceramic honeycomb structure of Comparative Example C1.
Figure 4B:
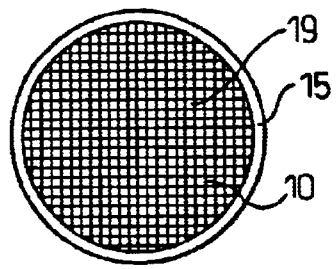

As shown in FIGS. 4A and 4B, the ceramic honeycomb structure of Comparative Example C1 is the same as Example E1 with the absence of the slits 2 formed in Example E1.

The ceramic honeycomb structures of Examples E1–E3 and Comparative Example C1 were subjected to a thermal shock test with a thermal shock of 700–900° C. to determine the durability based on the presence or absence of cracks.

The thermal shock was applied by bringing an electric furnace to a prescribed temperature and then holding a honeycomb structure therein for 20 minutes and subsequently allowing it to stand in air.

Figure 5:
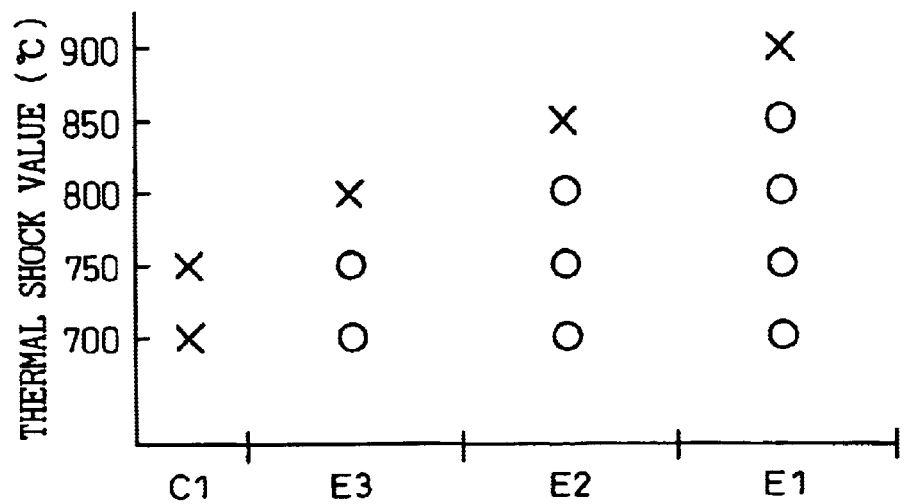
FIG. 5 is a graph showing the results of a thermal shock test with an embodiment of the invention.
Figure 6A:
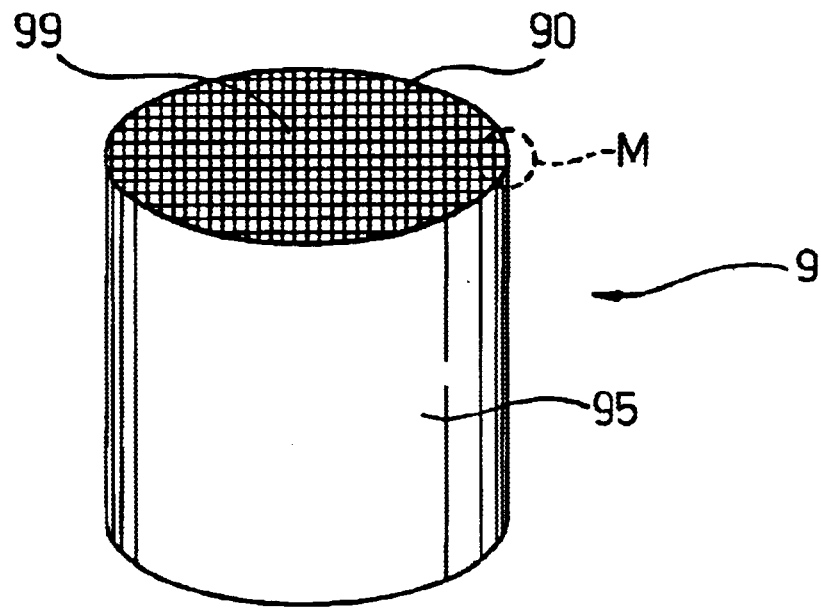
FIG. 6A is a perspective view of a conventional ceramic honeycomb structure.
Figure 6B:
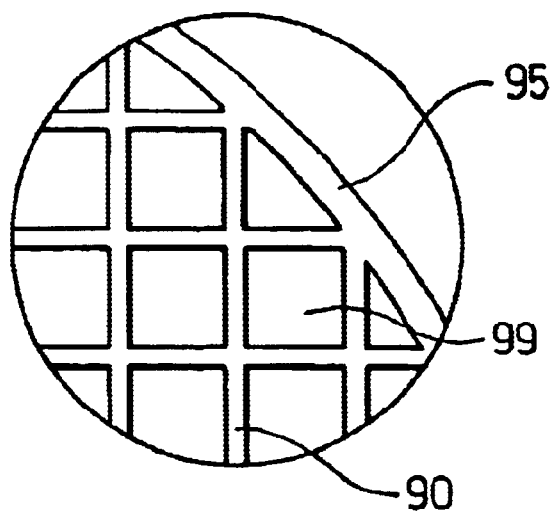
FIG. 6B is a magnified view of section M of FIG. 6A.

The results of the test are shown in FIG. 5.

Here, the type of ceramic honeycomb structure is shown on the horizontal axis and the thermal shock value (° C.) is shown on the vertical axis; cracking is indicated by x, and the absence of cracking is indicated by O.

As this graph shows, Comparative Example C1 which had no slits 2 exhibited cracking in the outer shell even with a thermal shock of 700° C. In contrast, Examples E1–E3 which had slits 2 exhibited no cracking even with application of a high thermal shock of 750° C.

This is attributed to the fact that with Examples E1–E3, the high tensile stress exerted on the outer shell 15 upon thermal shock was successfully released by the slits 2. However, since Comparative Example C1 had no slits 2 the outer shell 15 could not release its tensile stress, and this is believed to have resulted in the cracking.

In Examples E1 to E3, a larger number of slits 2 within a range of 1–8 slits resulted in higher durability. This demonstrates that the thermal shock resistance is improved with a greater number of divisions of the outer shell 15 by a number of slits 2 in a range that can still provide the overall strength.

What is claimed is:

1. A ceramic honeycomb structure comprising:

partitions arranged in a lattice forming a plurality of cells; and an outer shell connected with said partitions and surrounding the perimeter of the partitions, wherein said partitions and said outer shell being formed of ceramic material, wherein said outer shell is provided with slits formed by cutting said outer shell in the lengthwise direction along its entire length, and said cells are not provided with slits, and wherein said partitions and outer shell are principally constructed of cordierite, and said honeycomb structure is monolithic.

2. A ceramic honeycomb structure according to claim 1, wherein cross-sectional surfaces of said outer shell formed by said slits abut against each other along the entire length of said slits.

3. A ceramic honeycomb structure according to claim 1, wherein a plurality of said slits are formed.

4. A ceramic honeycomb structure according to claim 2, wherein a plurality of said slits are formed.

5. A ceramic honeycomb structure according to claim 3, wherein said slits are formed at roughly equal spacings.

6. A ceramic honeycomb structure according to claim 4 wherein said slits are formed at roughly equal spacings.

7. A ceramic honeycomb structure according to claim 3, wherein the spacings between said slits are formed such that at least two partitions are connected to the outer shell between adjacent slits.

8. A ceramic honeycomb structure according to claim 4, wherein the spacings between said slits are formed such that at least two partitions are connected to the outer shell between adjacent slits.

9. A ceramic honeycomb structure according to claim 5, wherein the spacings between said slits are formed such that at least two partitions are connected to the outer shell between adjacent slits.

10. A ceramic honeycomb structure according to claim 6, wherein the spacings between said slits are formed such that at least two partitions are connected to the outer shell between adjacent slits.

11. A ceramic honeycomb structure according to claim 1, wherein said outer shell has a cylindrical shape with an outer diameter of 50–150 mm and a length of 50–200 mm, the thickness of said partitions is 0.04–0.3 mm, and said cells are square or hexagonal with a length on one side of 0.5–1.5 mm.

12. A ceramic honeycomb structure according to claim 1, wherein a gap, void of any material, is maintained between cross-sectional surfaces of said outer shell formed by said slits.

* * * * *